No. 719,076. PATENTED JAN. 27, 1903.
J. E. BERING.
CHECK ROW CORN PLANTER.
APPLICATION FILED AUG. 18, 1902.
NO MODEL. 3 SHEETS—SHEET 1.

Witnesses:
JBWeir
Loris M. F. Whitehead

Inventor:
James E. Bering.

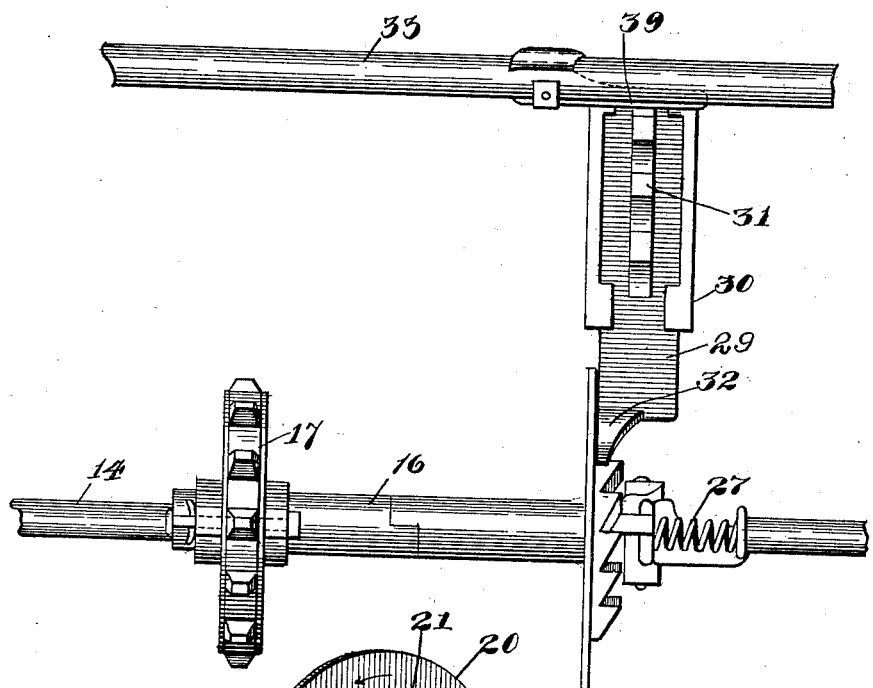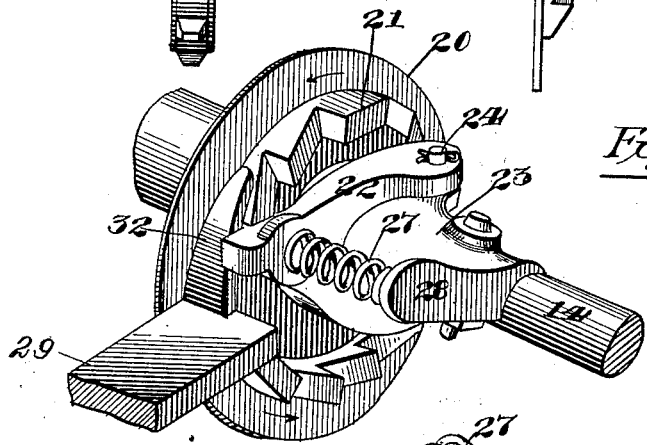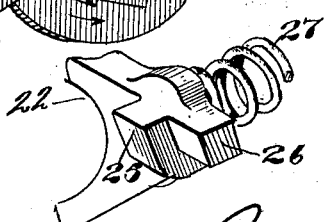

No. 719,076. PATENTED JAN. 27, 1903.
J. E. BERING.
CHECK ROW CORN PLANTER.
APPLICATION FILED AUG. 18, 1902.
NO MODEL.
3 SHEETS—SHEET 3.

Witnesses: Inventor

UNITED STATES PATENT OFFICE.

JAMES E. BERING, OF DECATUR, ILLINOIS, ASSIGNOR TO CHAMBERS, BERING QUINLAN COMPANY, OF DECATUR, ILLINOIS, A CORPORATION OF ILLINOIS.

CHECK-ROW CORN-PLANTER.

SPECIFICATION forming part of Letters Patent No. 719,076, dated January 27, 1903.

Application filed August 18, 1902. Serial No. 120,138. (No model.)

*To all whom it may concern:*

Be it known that I, JAMES E. BERING, a citizen of the United States, residing at Decatur, in the county of Macon and State of Illinois, have invented certain new and useful Improvements in Check-Row Corn-Planters, of which the following is a specification, reference being had to the accompanying drawings.

My invention relates to corn-planters, and particularly to that class of corn-planters which are known as "cumulative drop-planters"—that is to say, planters in which the seedbox is provided with a seed-plate having openings which are adapted to contain a single grain of corn at a time, the seed-plate being so driven as to deposit several grains of corn together with each throw or movement of the check-rower devices.

Still more in detail my invention relates to planters in which the seed-plate is given a suitable amount of rotation at suitable intervals with each throw of the check-rower wire by means of driving mechanism driven from the main wheels of the planter. In such cases various forms of clutch mechanism are used, one member of which is continuously rotated by means of a sprocket-chain and sprocket-wheel driven from the wheels of the planter, and the other member, connected with the shaft for driving the seed-plate, is thrown intermittently into engagement with the first member of the clutch mechanism with each throw of the check-rower devices, whereby the seed-plate, with each movement of the forked lever, is given an amount of rotation sufficient to deposit the required number of grains of corn in the runner, so that they will be deposited in the ground together in a heap.

The object of my invention is to provide new and improved devices which will throw the clutch mechanism into and out of engagement with each throw of the check-rower devices.

Figure 1:
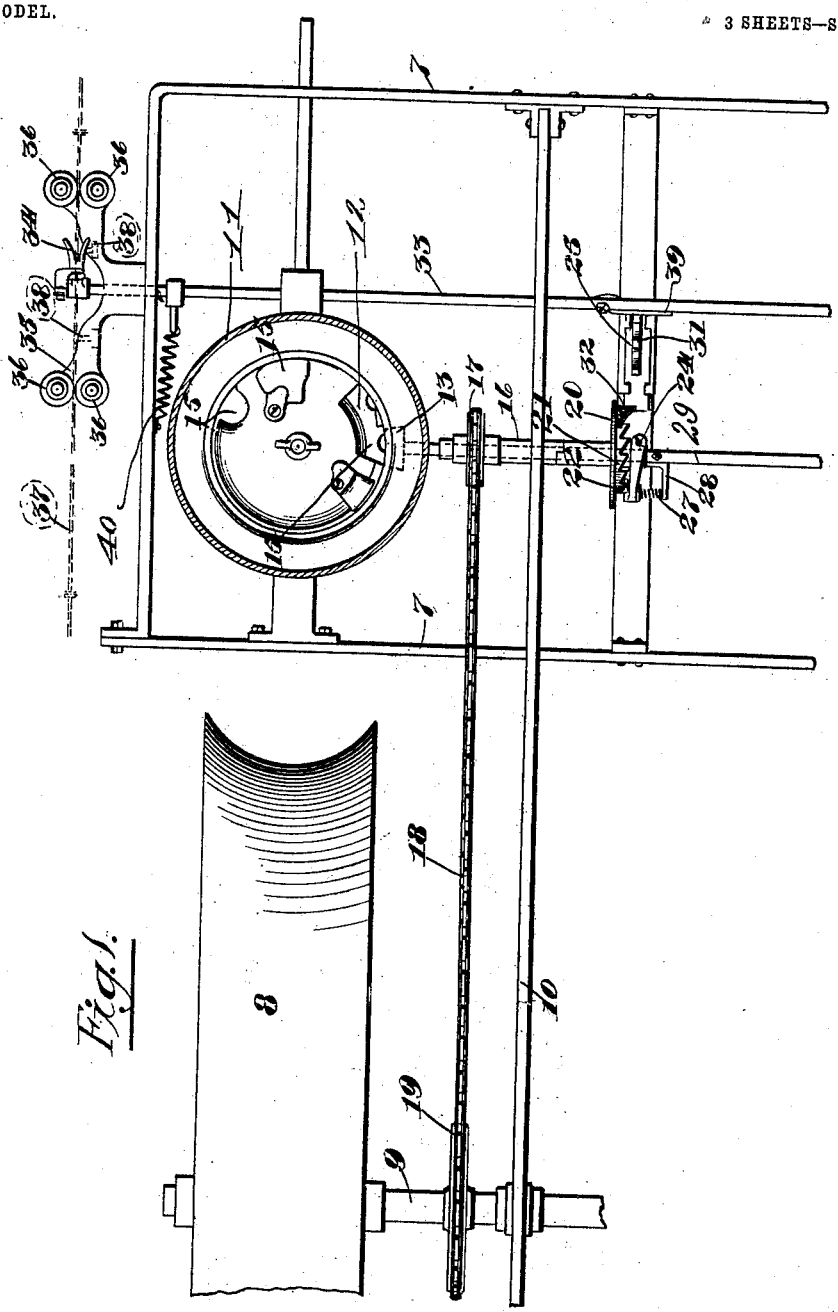
Figure 3:
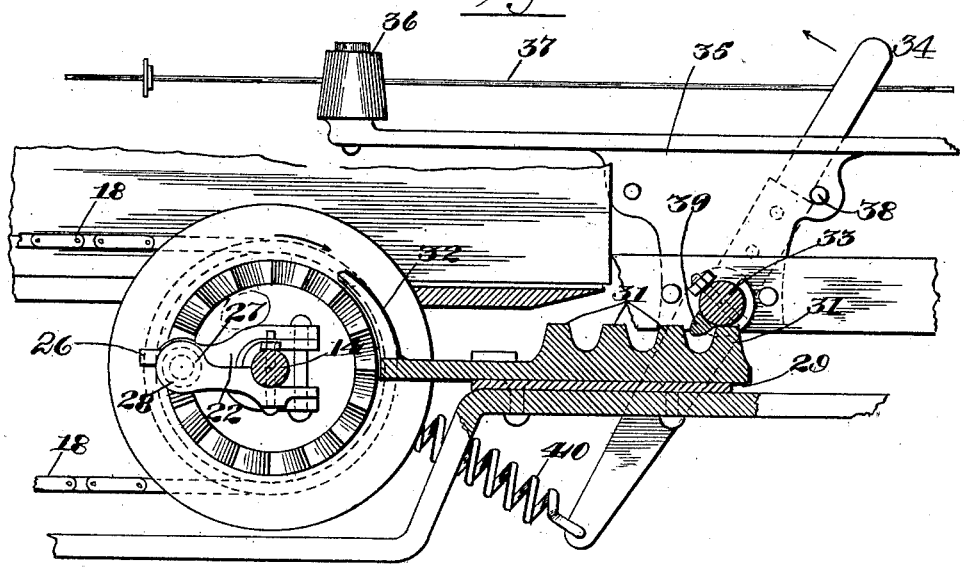
Figure 4:
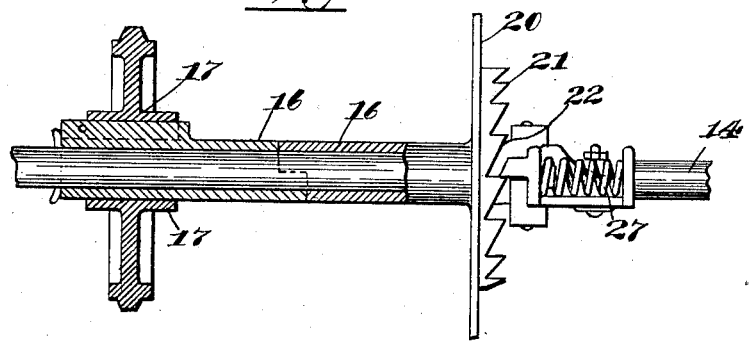

In the drawings, Figure 1 is a top or plan view of a portion of the planter. Fig. 2 is an enlarged detail, being a top or plan view of the clutch mechanism. Fig. 3 is an enlarged detail, being a side elevation of the clutch mechanism. Fig. 4 is an enlarged detail, being a side view of the clutch mechanism and part of the shaft on which it is mounted, partly in vertical section. Fig. 5 is an enlarged detail, being a perspective view of the clutch mechanism; and Fig. 6 is an enlarged detail, being a view of the end of the clutch member mounted on the seed-plate driving-shaft.

Referring to the drawings, 7 indicates the front or runner frame of the planter.

8 indicates one of the driving-wheels of the planter, secured upon an axle 9, which is journaled in the rear or wheel frame 10, which is hinged to the front frame of the planter in the usual manner.

11 indicates a seedbox carried on the front frame and provided with a seed-plate 12 of any well-known form and construction.

The planter is provided with the usual runners or furrow-opener and seed-tube, which, being no part of my present invention and being of any approved form and construction, are not shown.

The plate 12 is driven by means of the usual annular gear on its lower surface or connected with the seed-plate, meshing with a gear 13, which is keyed or otherwise secured upon a shaft 14, journaled in the front frame of the planter.

The seed-plate 12 is provided with the usual seed-pockets 15, which, as said above, are adapted to contain a single grain of corn at a time and which may be of any required number. In ordinary practice they will be twelve in number, and the gearing driving the seed-plate will be so constructed that the seed-plate will make a quarter of a rotation with each rotation of the shaft 14, and thereby deposit three grains of corn in the usual opening above the runner, which, being of the well-known type, is not shown.

16 indicates a sleeve which for purposes of construction only is preferably of two parts and which is journaled upon the shaft 14.

17 indicates a sprocket-wheel which is keyed or otherwise secured upon the sleeve 16 and is connected by means of a sprocket-chain 18 with a sprocket-wheel 19, which is keyed or otherwise secured to the main axle 9 of the rear frame.

20 indicates a disk having upon one of its faces an annular ratchet 21, the teeth of which are so shaped as to engage the dog, hereinafter described, when the planter is driven forward and the dog is in engaging position.

22 indicates a dog which is pivoted upon a support 23 by means of pivots 24. The support 23 is bolted or otherwise secured to the shaft 14. The dog 22 is provided near its outer end with a projection 25, which is adapted to engage with the teeth of the ratchet 21, and is also provided with a projecting end 26, which projects beyond the periphery of the ratchet 21.

27 indicates a spring which bears upon the dog 22 near its outer end and upon a stud or shoulder 28, formed upon the support 23, and operates to normally hold the dog 22 in engagement with the ratchet 21. The ratchet and dog form the two members of a clutch mechanism, which operates as hereinafter described.

29 indicates a slide-bar which is slidingly mounted in a suitable bearing 30, secured to the front frame 7. The slide-bar 29 is provided upon its upper surface with several studs 31. (Best shown in Figs. 2 and 3.) The end of the slide-bar 29 nearest the clutch mechanism is provided with an upturned wedge-shaped projection 32, narrowest at its further end and sloping toward its base. The projection 32 is preferably curved, as is best shown in Figs. 3 and 5, so as to conform to the outer contour of the annular ratchet 21.

33 indicates a shaft which is journaled in the front frame and carries at its outer end a forked lever 34, which may be of any well-known form and construction.

35 indicates the usual check-row head, provided with guiding-sheaves 36, through which the check-rower wire 37 passes as the machine is driven forward in the well-known way. It is also provided with stops 38, which limit the throw of the forked lever 34.

The shaft 33 is provided with a lug 39, (see Fig. 3,) which may be bolted or otherwise secured to said shaft. The lug 39 is adapted to play in the notches between the projections 31 and to engage the said projections 31 as the forked lever is thrown by the action of the usual spring 40, which is connected with the shaft 33 in the usual manner and operates to hold the parts normally in the position shown in Fig. 3. By means of the engagement of the lug 39 with the projections 31 the slide-bar 29 is reciprocated back and forth—that is to say, when a knot on the check-rower wire operates to throw the forked lever 34 in the direction indicated by the arrow shown in Fig. 3 or rearward the lug 39 moves in the opposite direction and engaging with one of the projections 31 moves the slide-bar forward and withdraws the wedged projection from the annular ratchet 21. As soon as the buttons on the check-rower wire disengage the fork the fork is returned to the position shown in Fig. 3 by the springs 40 rocking the shaft 33 backward and by the engagement of the lug 39 with one of the projections 31, forcing the slide-bar inward into the position shown in Fig. 3. The operation of the spring 40 being such as to normally hold the parts in the position shown in Fig. 3, the wedge-shaped projection 32 of the slide-bar 29 will normally lie close upon the periphery of the annular ratchet 21 and by the engagement of its wedge-shaped surface with the projections 26 of the dog 22 will hold the said dog 22 against the action of the spring 27 out of engagement with the ratchet 21.

The operation of my devices is as follows: The planter being driven forward, the rotation of the axle 9 will, by means of the sprocket-wheels 17 and 19 of the sprocket-chain 18, cause the sleeve 16 to be continuously rotated, rotating the ratchet 21 in the direction indicated by the arrows on the figures. The parts, as I have shown, being normally in the position shown in Figs. 3 and 5, the dog 22 will be held out of engagement with the ratchet 21, and the shaft 14 therefore will not be rotated. When the forked lever 34 is thrown backward by the knots on the check-rower wire 37, the slide-bar 29 will be moved forward, as described above, withdrawing its wedge-shaped projection 32 from the ratchet 21. The dog 22 will thereupon by the action of the spring 27 be thrown into engagement with the teeth of the annular ratchet and the shaft 14 will be rotated by the clutch so formed, giving to the seed-plate 12 the partial rotation above described and depositing the required number of grains of corn in the ground or second drop in the usual manner. As soon as the button upon the check-rower wire slips from the forked lever the forked lever will be immediately returned to its original position by the action of the spring 40. The slide-bar 29 will be moved inward and the wedge-shaped projection 32 again brought close to the periphery of the ratchet 21. When one complete rotation of the shaft 14 is made, the projection 26 on the dog 22 will engage the inclined surface of the projection 32 and will ride up it, throwing it out of engagement with the annular ratchet.

That which I claim as my invention, and desire to secure by Letters Patent, is—

1. In a corn-planter, the combination with a seedbox, a seed-plate rotatably mounted therein, a shaft geared to said seed-plate and adapted by its rotation to rotate the same, and check-rower mechanism, of a sleeve journaled on said shaft, means for driving said sleeve, a clutch member secured to said sleeve, a dog carried by said shaft and rotatable therewith and adapted to engage with said clutch member, a spring adapted to normally hold said dog in engagement with said clutch member, a slide-bar, means connected with the check-rower mechanism and adapted when operated to reciprocate said slide-bar with each movement of the check-rower mechanism, said slide-bar being adapted at one end to be normally interposed between said clutch member and said dog to disengage the same and to be withdrawn from its operative position between said dog and clutch member with each throw of the check-rower mechanism, substantially as described.

2. In a corn-planter, the combination with a rotatable seed-plate, a shaft geared to said seed-plate and adapted by its rotation to rotate the same, and check-rower mechanism, of a sleeve journaled on said shaft, mechanism for rotating said sleeve, an annular ratchet mounted on said sleeve, a dog mounted on said shaft, a spring adapted to normally hold said dog in engagement with said ratchet, a slide-bar provided with a wedge-shaped projection adapted, when said bar is moved toward said clutch, to interpose between said dog and said ratchet and disengage the same, and means connected with the check-rower mechanism, and adapted when operated to reciprocate said bar to move said projection out of and into engaging position with each throw of the check-rower mechanism, substantially as described.

3. In a corn-planter, the combination with an axle, and wheels carried thereby, a rotatable seed-plate, and a shaft geared to said seed-plate and adapted by its rotation to rotate the same, of a sleeve journaled on said shaft, means for driving said sleeve from the axle of the corn-planter, an annular ratchet secured to said sleeve, a support secured to said shaft, a dog pivoted to said support, a spring adapted to normally hold said dog in engagement with said annular ratchet, a slide-bar provided with a wedge-shaped projection adapted to be interposed between said ratchet and said dog and disengage the same, said slide-bar being provided with projections, a rock-shaft provided with a lug adapted to engage the projections on said slide-bar, and check-rower mechanism connected with said rock-shaft, substantially as described.

4. In a corn-planter, the combination of a rotatable seed-plate, a shaft geared to said seed-plate and adapted by its rotation to rotate the same and check-rower mechanism, of a sleeve journaled on said shaft, mechanism for rotating said sleeve, an annular ratchet mounted on said sleeve, a support mounted upon said sleeve, a dog pivotally connected to said support and adapted to engage the said ratchet, a spring connected with said support and to said dog and adapted to normally hold said dog in engagement with said ratchet, a slide-bar provided with a wedge-shaped projection adapted, when said bar is moved toward said clutch, to interpose between said dog and said ratchet and disengage the same, said bar provided with a series of projections, a bearing for the said bar, and a rock-shaft connected with the check-rower mechanism, operated thereby, and provided with a lug, said check adapted to engage the projections on the slide-bar for reciprocating it when the rock-shaft is actuated by the check-rower mechanism.

JAMES E. BERING.

Witnesses:
J. FRANK DAVIS,
FILLMORE D. GARVER.